(12) United States Patent
Myrah et al.

(10) Patent No.: US 8,924,751 B2
(45) Date of Patent: Dec. 30, 2014

(54) SAS POWER MANAGEMENT

(75) Inventors: Michael G. Myrah, Cypress, TX (US); Balaji Natrajan, Spring, TX (US); Pruthviraj Herur Puttaiah, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 367 days.

(21) Appl. No.: 13/563,634

(22) Filed: Jul. 31, 2012

(65) Prior Publication Data
US 2014/0040640 A1 Feb. 6, 2014

(51) Int. Cl.
G06F 1/32 (2006.01)
G06F 3/06 (2006.01)

(52) U.S. Cl.
CPC ............ G06F 1/3278 (2013.01); G06F 3/0625 (2013.01)
USPC .......................................... 713/320; 710/240

(58) Field of Classification Search
CPC .... G06F 1/3278; G06F 3/0625; G06F 3/0653
USPC .......................................... 710/240; 713/320
See application file for complete search history.

(56) References Cited

U.S. PATENT DOCUMENTS

| | | | |
|---|---|---|---|
| 7,673,185 B2 | 3/2010 | Kalwitz et al. | |
| 7,743,269 B2 * | 6/2010 | Marks et al. | 713/323 |
| 8,037,362 B2 | 10/2011 | Suzuki et al. | |
| 8,127,165 B2 | 2/2012 | Qi et al. | |
| 8,843,666 B2 * | 9/2014 | Besmer et al. | 710/15 |
| 2007/0093124 A1 | 4/2007 | Varney et al. | |
| 2011/0107129 A1 | 5/2011 | Sinykin et al. | |

OTHER PUBLICATIONS

Seagate Technology, "Serial Attached SCSI (SAS) Interface Manual," Publication No. 100293071, Rev. C, Dec. 2009.*
Castro-Leon, E. et al., Using Intel Intelligent Power Node Manager to Minimize the Infrastructure Impact of the EMC Atmos Cloud Storage Appliances, Rev 1.3, Jan. 2010 <http://software.intel.com.sites/datacentermanager/atmospoweropt1_3c.pdf> <https://software.intel.com/sites/datacentermanager/atmospoweropt1_3c.pdf>.

* cited by examiner

*Primary Examiner* — Albert Wang
(74) *Attorney, Agent, or Firm* — Patent Law Group LLP; David C. Hsia

(57) ABSTRACT

A method is provided for a SAS (Serial Attached SCSI (Small Computer System Interface)) expander to manage power consumption of a wide port that includes multiple expander phys each operable in at least three power conditions. The method includes monitoring number of AIP primitives for the wide port over time, changing at least one expander phy to a lower power condition when the number of AIP primitives total less than a first threshold over a first period of time, and changing at least one expander phy to a higher power condition when the number of AIP primitives total more than a second threshold over a second period of time.

15 Claims, 3 Drawing Sheets

SAS POWER MANAGEMENT

BACKGROUND

Serial attached small computer system interface (SAS) is a communication protocol for enabling communication between computer devices. In the SAS protocol, SAS devices include initiator devices, target devices, and expander devices. Initiator devices are devices that can begin a SAS data transfer, while target devices are devices to which initiator devices can transfer data. Expander devices are devices that can facilitate data transfer between multiple initiator devices and multiple target devices. The SAS protocol utilizes a point-to-point bus topology. Therefore, if an initiator device is required to connect to multiple target devices, a direct connection can be established between the initiator device and each individual target device to facilitate each individual data transfer between the initiator device and each individual target device. A SAS switch is a SAS device that can include expander devices which can manage the connections and data transfer between multiple initiator devices and multiple target devices. A SAS fabric can include a network of initiator devices, target devices and expander devices.

BRIEF DESCRIPTION OF THE DRAWINGS

In the drawings.

Use of the same reference numbers in different figures indicates similar or identical elements.

DETAILED DESCRIPTION

As explained above, SAS (Serial Attached SCSI (Small Computer System Interface)) expanders facilitate communication between SAS devices. Each SAS expander has two or more external expander ports. A SAS expander allows a single SAS initiator to communicate with more SAS targets.

A SAS expander may include expander phys. A narrow port has one expander phy while a wide port has two or more expander phys that share the same address. Each expander phy includes a transceiver attached by a physical link to another expander phy at a different device, such as a SAS initiator or target. Expander phys that are powered up may use over 100 milliwatts (mW) of power while expander phys that are powered down may use about 10 mW of power. When a SAS expander uses one or more wide ports that each has more than one expander phy, power consumption may be reduced. For example, several watts of power may be saved by managing the power conditions of the expander phys. Across a data center, substantial power savings can result.

There are several different scenarios where wide ports are used in a SAS network or fabric. In one scenario, a cable connection may have four phys that make up the connection. In one scenario, two cables connect a server or SAS switch to a storage enclosure. In this case, eight expander phys are used. In another example, expanders may be connected to each other via inter-expander links to form a cascade or daisy-chain configuration.

Whenever there is not enough input/output (I/O) traffic between SAS initiators and SAS targets to saturate all the expander phys in a wide port, power may be consumed. Examples of the present disclosure may provide power management techniques to intelligently help reduce power consumption by powering down the expander phys and then powering them back up when I/O saturation is detected. In one example, the SAS network is dynamically adjusting or throttling the power usage based on I/O needs of the system.

Figure 1:
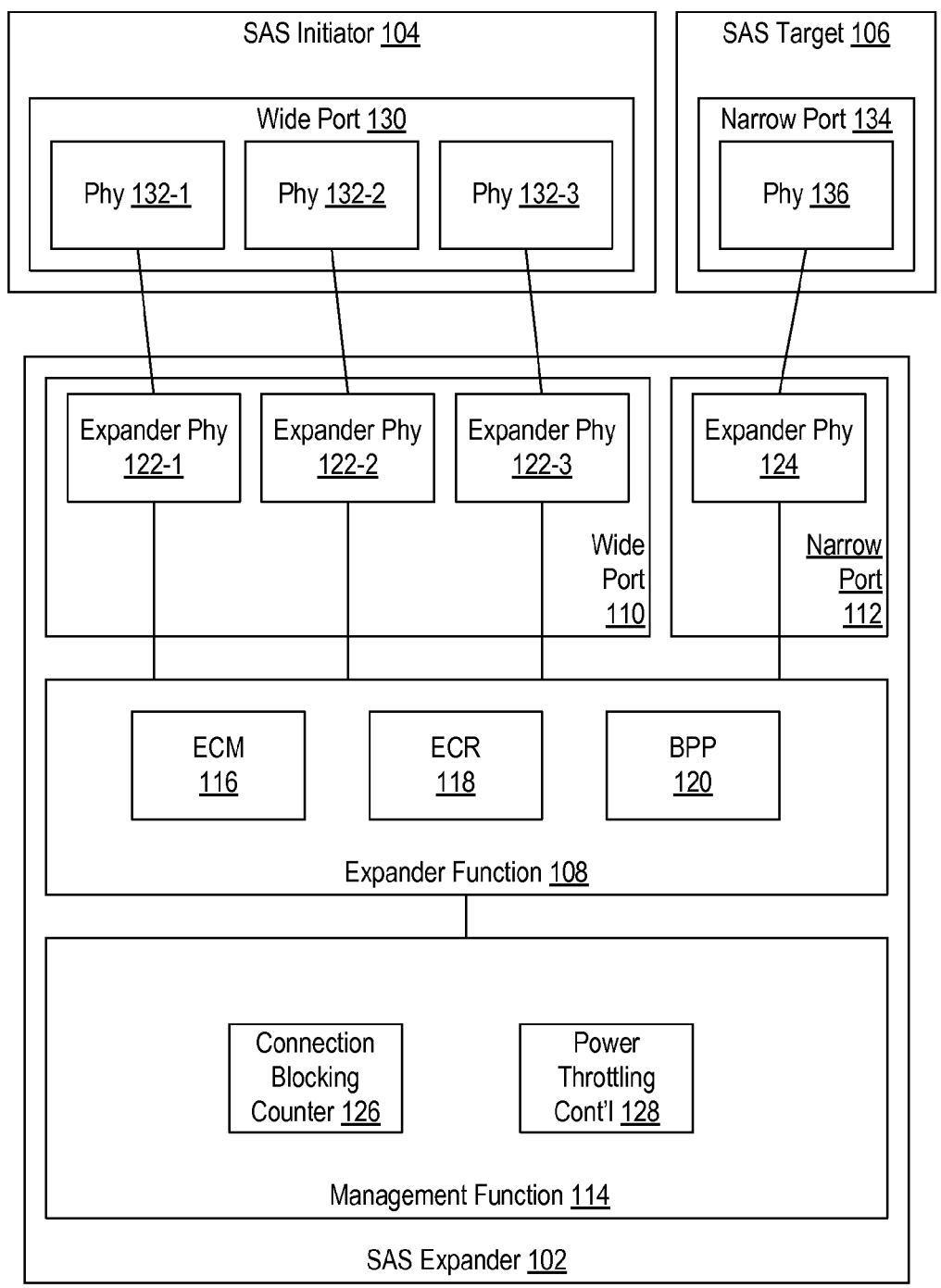
FIG. 1 is a block diagram of a SAS (Serial Attached SCSI (Small Computer System Interface)) system in one example of the present disclosure.

FIG. 1 is a block diagram of a SAS system 100 in one example of the present disclosure. The SAS system 100 includes a SAS expander 102, a SAS initiator 104 coupled to SAS expander 102, and a SAS target 106 coupled to SAS expander 102. It should be understood that SAS system 100 is one example configuration and that other configurations are possible such as a different number of expanders, targets, and initiators can be employed.

The SAS expander 102 includes an expander function block 108, a wide port 110 and a narrow port 112 coupled to expander function block 108, and a management function block 114 coupled to expander function block 104. Although one wide port 110 and one narrow port 112 are shown, SAS expander 102 may include only wide ports, only narrow ports, or any combination of wide and narrow ports.

The expander function block 108 includes an Expander Connection Manager (ECM) 116, an Expander Connection Router (ECR) 118, and a Broadcast Primitive Processor (BPP) 120. The ECM 116 maps a destination SAS address in a connection request to a destination phy. The ECM 116 arbitrates and then assigns or denies path resources for connection requests following SAS rules for arbitration and pathway recovery. When multiple SAS initiators try to connect to the same expander phy, ECM 116 can generate SAS primitives or commands to SAS initiators. For example, ECM 116 can generate an arbitration in progress (AIP) (WAITING ON CONNECTION) primitive back to one or more of the SAS initiators that have to wait for the expander phy. The term AIP stands for Arbitration In Progress and represents a condition that there is an arbitration in progress on a SAS link. The ECM 116 may be configured to generate an interrupt each time it sends an arbitration in progress (AIP) (WAITING ON CONNECTION) primitive to a SAS initiator.

The ECR 118 can perform routing functions including routing signal between pairs of phys (initiators and targets) as configured by ECM 116. The ECR 118 provides routing resources needed to support connections.

The BPP 120 can perform routing functions such as routing "topology" messages to appropriate devices (e.g. topology changes).

The expander function block 108 may be implemented with an application specific integrated circuit (ASIC). Alternatively expander function block 108 may be implemented with a processor that executes instructions stored on a non-transitory computer readable medium.

The wide port 110 includes two or more expander phys, and narrow port 112 has one expander phy. In the illustrated example, wide port 110 includes expander phys 122-1, 122-2, and 122-3 (referred to as "expander phys 122" collectively or "expander phy 122" for a generic individual expander phy), and narrow port 112 includes one expander phy 124. The expander phys 122 and 124 can provide the physical layer device interfaces to internal and external components. The expander phys 122 and 124 can arbitrate with ECM 116 and routes frames to and from other expander phys. The expander phy 122, 124 can operate in at least three power conditions. In one example, each expander phy 122, 124 can operate in four power conditions including an active phy power condition, a partial phy power condition, a slumber phy power condition, and a low phy power condition. In expander design implementations, greater power savings may increase latency in processing data.

The management function block 114 provides expander management (e.g., using serial management protocol) and vendor-specific enclosure management functions (e.g., using serial SCSI protocol/SCSI enclosure services). The management function block 114 includes a connection blocking counter 126 and a power throttling controller 128.

The connection blocking counter 126 keeps track of the number of AIP primitives at each wide port 110 over time based on the interrupts generated by ECM 116 for the corresponding wide port 110. In one example, connection block counter 126 tracks the number of AIP (WAITING ON CONDITION) primitives received at each wide port 110.

The throttling controller 128 sets the power conditions for expander phys 122 at each wide port 110 based the number of the corresponding port's AIP (WAITING ON CONNECTION) primitives over time.

The management function block 114 may be implemented with a processor that executes instructions stored on a non-transitory computer readable medium. Alternatively, management function block 114 may be implemented in an ASIC.

Figure 2:
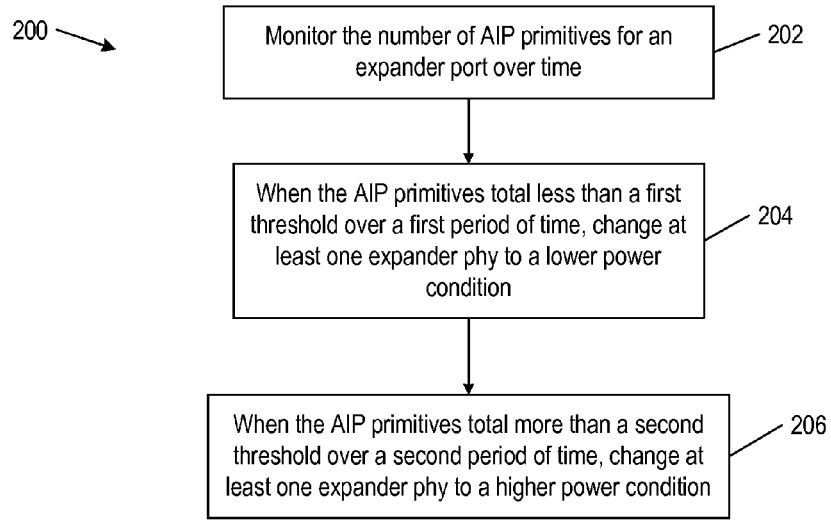
FIG. 2 is a flowchart of a method for a SAS expander of FIG. 1 to manage power consumption of a wide port with multiple expander phys in one example of the present disclosure.

FIG. 2 is a flowchart of a method 200 for SAS expander 102 to manage power consumption of wide port 110 with expander phys 122 in one example of the present disclosure. The expander phys 122 operate in at least three power conditions. The method 200 is performed by management function block 114, which may be implemented with a processor executing instructions stored in a non-transitory computer readable medium. The method 200 may start in block 202.

In block 202, the processor monitors the number of AIP primitives for wide port 110 over time. The block 202 may be followed by block 204.

In block 204, when the AIP primitives total less than or equal to a first threshold over a first period of time, the processor changes at least one expander phy 122 to a lower power condition. The block 204 may be followed by block 206.

In block 206, when the AIP primitives total more than a second threshold over a second period of time, the processor changes at least one expander phy 122 to a higher power condition. The second threshold is greater than the first threshold.

Figure 3:
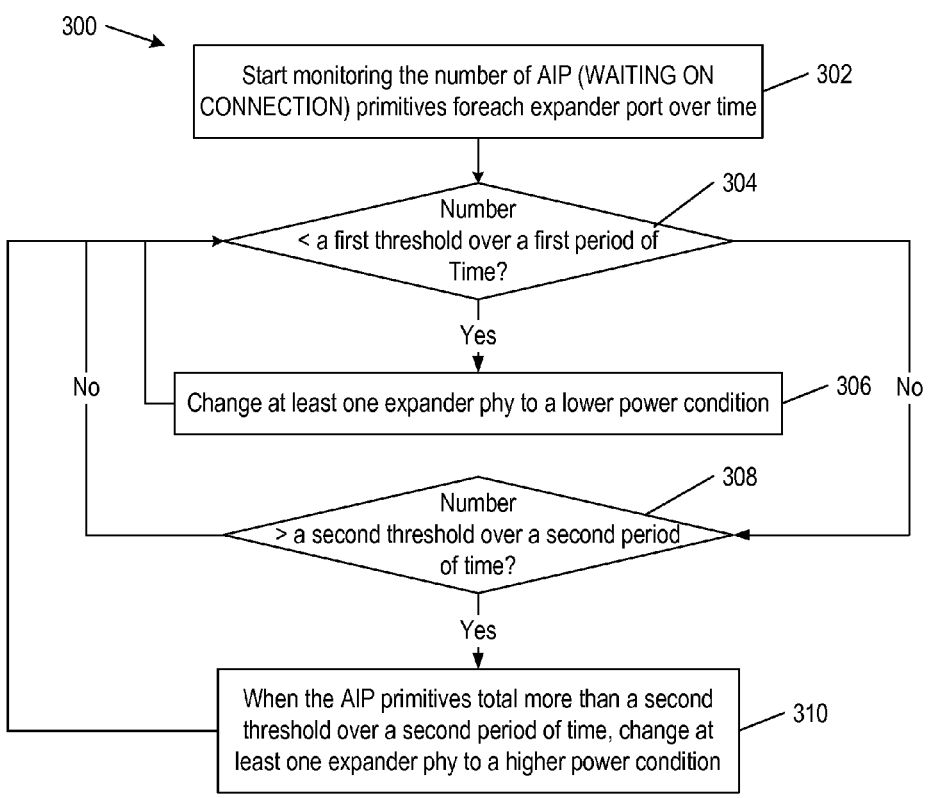
FIG. 3 is a flowchart of a method for a SAS expander of FIG. 1 to manage power consumption of a wide port with multiple expander phys in another example of the present disclosure.

FIG. 3 is a flowchart of a method 300 for SAS expander 102 to manage power consumption of wide port 110 with expander phys 122 in another example of the present disclosure. The method 300 is a variation of method 200. The method 300 may start in block 302.

In block 302, the processor starts monitoring the number of AIP primitives for each wide port 110 over time. In one example, the processor monitors the number of AIP (WAITING ON CONNECTION) primitives. The processor may receive interrupts from ECM 116 in expander function block 108 each time ECM 116 sends an AIP (WAITING ON CONNECTION) primitive to a SAS initiator. The block 302 may be followed by block 304.

In block 304, the processor determines if the AIP (WAITING ON CONNECTION) primitives total less than or equal to a first threshold over a first period of time. In one example, the first threshold is 0 and the first period of time may range from five (5) seconds to ten (10) minutes. A small number of AIP (WAITING ON CONNECTION) primitives may indicate that expander phys 122 are underutilized. If the AIP (WAITING ON CONNECTION) primitives total less than or equal to the first threshold over the first period of time, block 304 may be followed by block 306. Otherwise block 304 may be followed by block 308.

In block 306, the processor changes one expander phy 122 to a lower power condition (e.g., the next lower power condition) from its current power condition. Alternatively the processor changes two or more expander phys 122 to a lower power conditions.

In one example, expander phys 122 operates in four power conditions including an active phy power condition, a partial phy power condition, a slumber phy power condition, and a low phy power condition. In one example, at least one expander phy 122 is kept at a power condition not lower than the slumber phy power condition. In one example, lowest allowable power condition for all expander phys 122 at each wide port 110 is the slumber phy power condition.

The block 306 may loop back to block 304.

In block 308, the processor determines if the AIP primitives total more than a second threshold over a second period of time. In one example, the second threshold is 100 and the second period of time may range from two (2) seconds to ten (10) minutes. A large number of AIP (WAITING ON CONNECTION) primitives may indicate that phys 122 are overworked. If the AIP (WAITING ON CONNECTION) primitives total greater than the second threshold over the second period of time, block 308 may be followed by block 310. Otherwise block 308 loops back to block 304.

In block 310, the processor causes ECM 116 to change one expander phy 122 to a higher power condition (e.g., the highest power condition, such as the active phy power condition). Alternatively the processor causes ECM 116 to change two or more expander phys 122 to a higher power condition. The block 310 may loop back to block 304.

Although methods 200 (FIG. 2) and 300 (FIG. 3) are described in relation to a configuration using wide port 110, they may be applied to configuration using narrow port 112.

Figure 4:
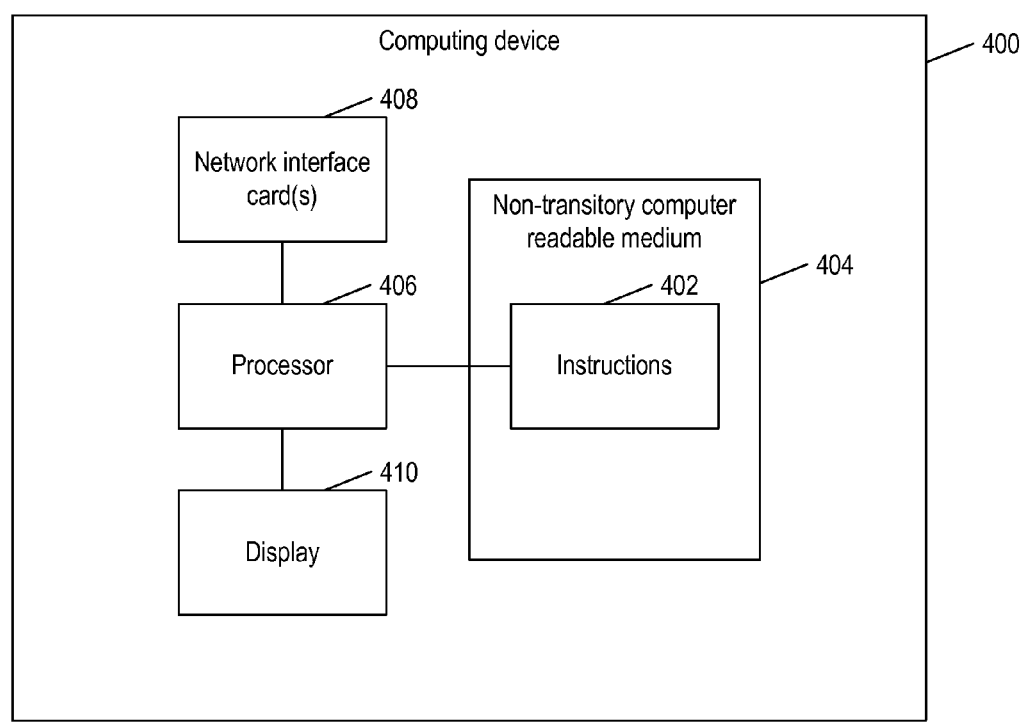
FIG. 4 is a block diagram of a computing device for implementing the SAS expander of FIG. 1 in one example of the present disclosure.

FIG. 4 is a block diagram of a computing device 400 for implementing the techniques of the present disclosure, including SAS expander 102 (FIG. 1), in one example of the present disclosure. The computing device 400 includes processor executable instructions 402 stored in a non-transitory computer readable medium 404, such as hard disk drive, a solid state drive, or another nonvolatile computer memory. A processor 406 executes instructions 402 to provide the described features and functionalities, which may be implemented by sending instructions and data to one or more network interface cards 408 or a display 410.

Various other adaptations and combinations of features of the examples disclosed are within the scope of the invention.

What is claimed is:

1. A method for a SAS (Serial Attached SCSI (Small Computer System Interface)) expander to manage power consumption of an expander port, the expander port comprising one or more expander phys each being operable in at least three power conditions, the method comprising:
monitoring number of AIP (Arbitration in Progress) primitives for the expander port over time;
when the number of AIP primitives total less than or equal to a first threshold over a first period of time, changing at least one expander phy to a lower power condition; and
when the number of AIP primitives total more than a second threshold over a second period of time, changing at least one expander phy to a higher power condition.

2. The method of claim 1, wherein each expander phy has four power conditions comprising an active phy power condition, a partial phy power condition, a slumber phy power condition, and a low phy power condition.

3. The method of claim 2, wherein a lowest allowable power condition for at least one expander phy is the slumber phy power condition.

4. The method of claim 2, wherein a lowest allowable power condition for all the expander phys is the slumber phy power condition.

5. The method of claim 1, wherein the AIP primitives include AIP (WAITING ON CONNECTION) primitives.

6. A non-transitory computer readable medium encoded with executable instructions for execution by a processor to:
monitor number of AIP (Arbitration In Progress) primitives of an expander port on a SAS (Serial Attached SCSI (Small Computer System Interface)) expander over time;
when the number of AIP primitives total less than or equal to a first threshold over a first period of time, changing at least one expander phy to a lower power condition; and
when the number of AIP primitives total more than a second threshold over a second period of time, changing at least one expander phy to a higher power condition.

7. The medium of claim 6, wherein each expander phy has four power conditions comprising an active phy power condition, a partial phy power condition, a slumber phy power condition, and a low phy power condition.

8. The medium of claim 7, wherein a lowest allowable power condition for at least one expander phy is the slumber phy power condition.

9. The medium of claim 7, wherein a lowest allowable power condition for all the expander phys is the slumber phy power condition.

10. The medium of claim 7, wherein the AIP primitives include AIP (WAITING ON CONNECTION) primitives.

11. A SAS (Serial Attached SCSI (Small Computer System Interface)) expander, comprising:
one or more expander phys forming an expander port;
an expander function block coupled to the expander port;
a management function block coupled to the expander function block to:
monitor number of AIP (Arbitration In Progress) primitives of the expander port over time;
when the number of AIP primitives total less than or equal to a first threshold over a first period of time, changing at least one expander phy to a lower power condition; and
when the number of AIP primitives total more than a second threshold over a second period of time, changing at least one expander phy to a higher power condition.

12. The SAS expander of claim 11, wherein each expander phy has four power conditions comprising an active phy power condition, a partial phy power condition, a slumber phy power condition, and a low phy power condition.

13. The SAS expander of claim 12, wherein a lowest allowable power condition for at least one expander phy includes the slumber phy power condition.

14. The SAS expander of claim 12, wherein a lowest allowable power condition for all the expander phys includes the slumber phy power condition.

15. The SAS expander of claim 11, wherein the AIP primitives include AIP (WAITING ON CONNECTION) primitives.

* * * * *